April 9, 1963 R. A. CHERCHI 3,084,505
EXHAUST DUCT FOR TURBO-JET ENGINE
Filed May 3, 1960
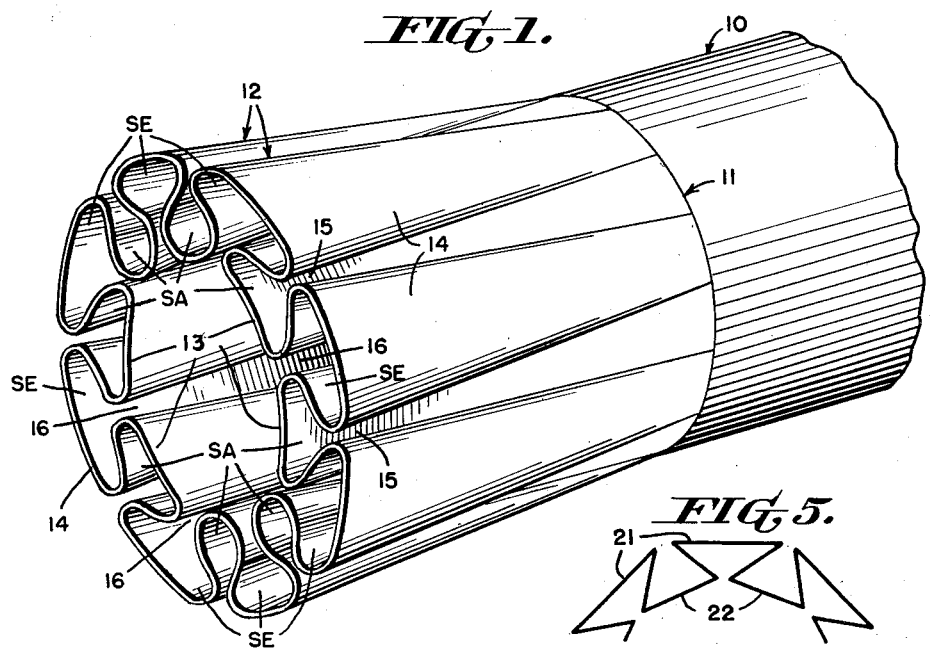
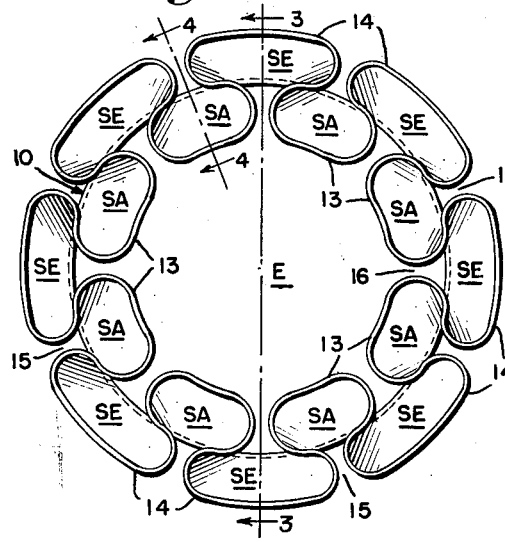
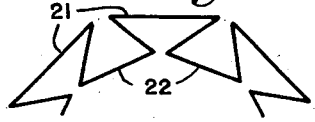
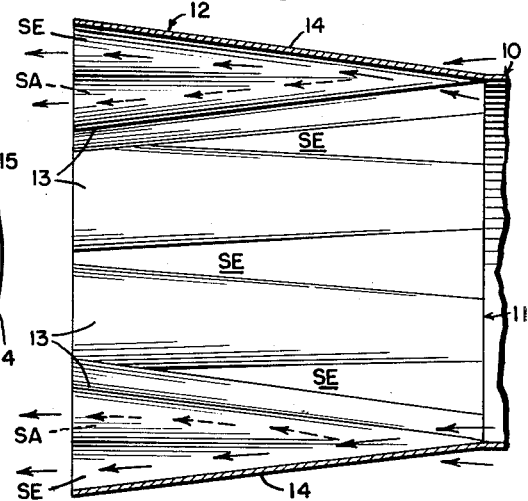
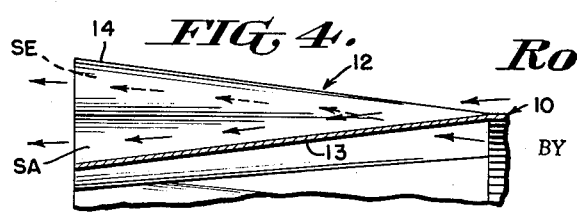
INVENTOR,
Robert A. Cherchi
BY
ATTORNEY 3,084,505
EXHAUST DUCT FOR TURBO-JET ENGINE
Robert A. Cherchi, 4704 Leprechaun Court,
Jacksonville, Fla.
Filed May 3, 1960, Ser. No. 26,656
1 Claim. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

The present invention relates to exhaust ducts for jet engines. More particularly the invention relates to an improved exhaust duct for reducing noise and for reducing the drag of jet engines wherein the trailing edge of the sheet metal duct is formed with longitudinal corrugations or inner and outer convolutions alternately arranged around the periphery thereof, each of the convolutions gradually reducing in depth to merge with the duct at a distance forward of the trailing edge. Each convolution is shaped to overlap adjacent alternate convolutions thus to provide alternate overlapping streams of exhaust gases and outside air around the periphery of the main exhaust stream.

An object of the present invention is to provide an improved exhaust duct wherein reduced drag and reduced noise is accomplished.

Another object is to provide an improved exhaust duct shaped to cause the emission therefrom of staggered overlapping streams of exhaust gases and air surrounding the main exhaust stream thus to reduce noise and reduce drag.

Other objects and many of the attendant advantages of this invention will be readily appreciated as the same become better understood by reference to the following description when considered in connection with the accompanying drawings wherein:

FIG. 1 is a perspective view showing the exhaust duct of the present invention;

FIG. 2 is a rear elevation of the exhaust duct;

FIG. 3 is a sectional view taken along the line 3—3 of FIG. 2;

FIG. 4 is a sectional view taken along the line 4—4 of FIG. 2; and,

FIG. 5 is a diagrammatic view showing a slight modification of the present invention.

Referring more particularly to the drawings wherein like numerals indicate like parts throughout the several views, 10 indicates, generally, a thin-walled exhaust duct for a jet engine. On the trailing end of duct 10 is a corrugated portion or section 11 having formed therein a plurality of overlapping corrugations 12 running along the length thereof. The corrugations 12 comprise inwardly bent convolutions 13 and outwardly bent convolutions 14.

As shown in FIGS. 1 and 2, each of the longitudinal convolutions 13 and 14 overlaps the adjacent convolutions. At the trailing edge of portion 11, the adjacent sides of the convolutions 13 are closely spaced, as are the sides of convolutions 14, thus defining the constricted end of slots 15 and 16, the slots gradually widening to the point of juncture of the convolutions 13 and 14 with the duct 10. As shown in FIGS. 3 and 4, the convolutions 13 taper longitudinally inwardly toward the axis of portion 11 from the aforementioned point of juncture while the convolutions 14 taper outwardly away from the axis of portion 11. This construction provides, as shown particularly in FIG. 2, a primary exhaust stream area E surrounded by a plurality of circumferentially spaced secondary air stream areas SA, and exteriorly of air stream areas SA and in staggered relation thereto is a plurality of circumferentially spaced secondary exhaust stream areas SE. Each of the areas SE is connected with the area E through the passage 16 while each of the areas SA is connected with the outside air stream through the passage 15.

From the foregoing it is clear that, in following the teaching of the invention, the peripheral portion of the exhaust stream emitted from the portion 11 of the duct 10 is divided into a plurality of secondary air streams interposed in staggered relation therewith between the secondary exhaust streams and the primary exhaust stream. It is also apparent that the secondary air streams and the secondary exhaust gas streams will form, shortly after leaving the convolutions at the trailing edge, an inner layer of air and an outer layer of exhaust gases surrounding the main exhaust stream.

It has been found by experiment that the foregoing structure provides reduced drag and noise in the operation of jet-propelled vehicles. Reduction in drag is accomplished by the mixing of the secondary streams of air and exhaust gases which provides a layer of intermediate speed between the higher speed of the main exhaust stream and the lower speed of the outer air, thus reducing friction losses between the main exhaust stream and the surrounding air. The reduction of noise is accomplished by surrounding the main exhaust stream with the layer comprising the mixed smaller streams of exhaust gases and air.

If desired, the device of the present invention may be formed in other shapes to produce the results set forth in this application. For example, the duct may be formed with triangular corrugations 21, 22 as indicated in the diagram of FIG. 5 without departing from the spirit of the invention. It is also to be construed that the convolutions may follow the general cross-sectional shape of the exhaust duct which, in the form shown, is circular, but may be any suitable shape, such as oval or rectangular.

Obviously many variations of the present invention are possible in the light of the above teachings. It is therefore to be understood that within the scope of the appended claim the invention may be practiced otherwise than as specifically described.

What is claimed is:

A jet exhaust duct comprising a trailing edge having inner and outer corrugations, a first plurality of longitudinally tapered passages formed by the outer corrugations in said duct, a second plurality of longitudinally tapered passages formed by the inner corrugations in said duct, the widest portion of each of said first and second tapered passages being at the trailing edge of said duct, the inner and outer corrugations being positioned in overlapping relation with respect to each other, each of said first passages directing a widening stream of air within the periphery of the exhaust stream of said duct, each of said second passages directing a widening stream of exhaust gases exteriorly of said air streams thereby to provide a plurality of merged inner and merged outer streams of air and exhaust gases, respectively, surrounding the main exhaust stream.

References Cited in the file of this patent

UNITED STATES PATENTS

| | | |
|---|---|---|
| 2,297,910 | Neuland | Oct. 6, 1942 |
| 2,486,019 | Goddard | Oct. 25, 1949 |
| 2,565,308 | Hottel | Aug. 21, 1951 |
| 2,935,842 | Highberg | May 10, 1960 |

FOREIGN PATENTS

| | | |
|---|---|---|
| 136,035 | France | Apr. 12, 1880 |
| 766,986 | Great Britain | Jan. 30, 1957 |